May 8, 1956      D. C. STICKLES      2,744,846
LAMINATED PROTECTIVE MATERIAL
Filed Feb. 4, 1954
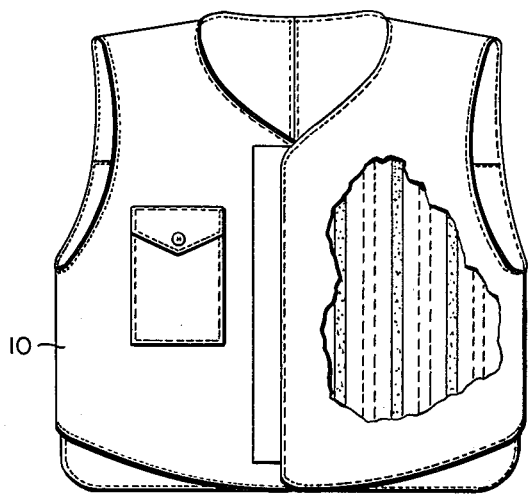
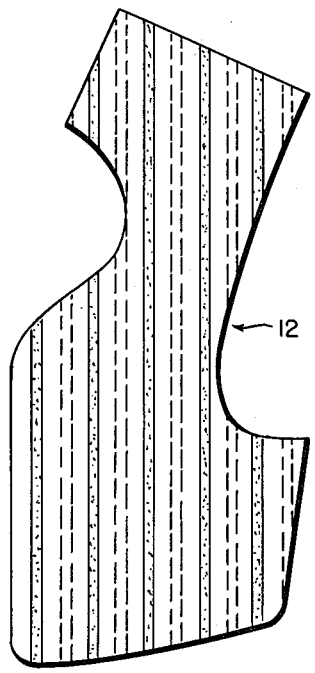
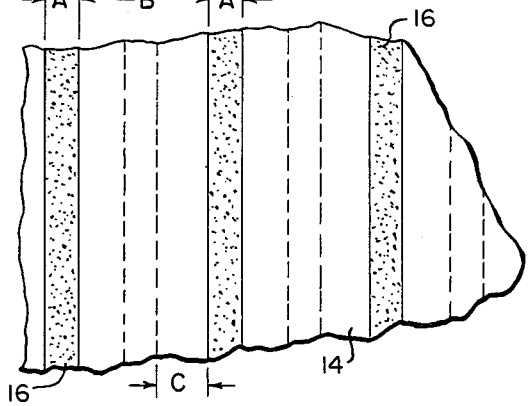
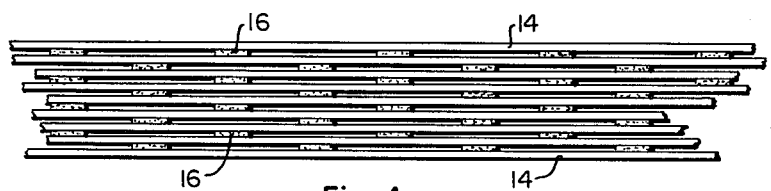
INVENTOR.
DONALD C. STICKLES
BY
Kenway, Jenney, Witter & Hildreth
ATTORNEYS

United States Patent Office 2,744,846
Patented May 8, 1956

2,744,846
LAMINATED PROTECTIVE MATERIAL

Donald C. Stickles, Marlboro, Mass., assignor to Victory Plastics Co., Hudson, Mass., a corporation of Massachusetts Application February 4, 1954, Serial No. 408,270

2 Claims. (Cl. 154—52.5)

This invention relates to protective material and more particularly to laminated structures designed for protection of equipment and personnel against flying missiles, such as shrapnel, bullets, and the like.

In the construction of protective material a number of factors are important. In the first place, the material must provide adequate absorption of kinetic energy of bullets, shrapnel or the like. Secondly, a high degree of flexibility is often necessary, particularly where the material is to be employed in a garment and must provide adequate resistance to cutting or tearing in order to absorb the above-mentioned kinetic energy. Thirdly, the material and its method of construction should be attractive, simple, efficient and suitable for mass production methods. Numerous materials have been developed for the general purpose of providing protection for equipment and personnel, but in every case they have contained certain prominent disadvantages. From the point of view of providing adequate protection, improved results have been obtained in materials with regard to absorption of kinetic energy by employing a multiplicity of laminated layers of woven nylon fabric. It will be understood that as as a missile penetrates a laminated structure the successive layers recede and when the structure is employed adjacent to the body of a person, the fabric cannot be permitted to recede too far or else the person wearing the garment will be injured even though the missile may not penetrate the protective material. For this reason and also in order to prevent the fabric from shifting and bunching within the structure during use, the layers of nylon have been bonded together by various types of synthetic resins, and by various types of bonding methods. One of these included applying a very thin layer of the resin to the entire surface of each layer, and another method included bonding the layers in discrete spots. Neither of these structures were satisfactory because they were too stiff and cumbersome. Even alternating the resin areas in the spot laminated structure resulted in a relatively stiff and unwieldly fabric. While the structure in which the resin was applied to the entire surface of the fabric could be mass produced, the fabric was not suitable where flexibility was a requirement, and although the spot laminated fabric was somewhat more flexible, its bonding requirements were not altogether suitable for mass production techniques because the bonded areas had to be carefully placed in registration one after another by hand. In illustration of the fact that the spot laminated structure was not sufficiently flexible, it should be noted that it was found advisable to eliminate the bonding resin from that portion of the shoulder which if appreciably stiffened would interfere with the normal shoulder action of a man using a rifle.

It is an object of my invention to provide a highly flexible and adequately protective material in which layers are bonded together in such a way that they cannot as a whole shift or bunch while worn, and the construction of which is attractive and adapts itself readily to mass production methods. It is a further object of my invention to provide a laminated protective structure which is sufficiently flexible to accommodate sharp bends without impairing the anti-ballistic properties of the structure or permitting the layers as a whole to become disarranged during use.

In the accomplishment of these and other objects of my invention in a preferred embodiment thereof, I construct a protective material by laminating a multiplicity of layers of woven nylon fabric. These layers are bonded together by means of a synthetic resin applied to the fabric in straight, equally spaced and parallel lines with the resin lines being applied to succeeding layers of the fabric in staggered relation. Thus, a given intermediate layer will be bonded to the layer next above it along spaced lines on its upper surface and will be bonded to the layer next below it along similarly spaced lines parallel thereto and located on its under surface halfway between the layers of resin bonding the said intermediate layer to the layer above.

It is a feature of my invention that on each layer of the bonded laminated structure, there is a straight and continuous path of material comprising a substantial portion of the area of each layer between the bonded areas which is completely free of resin. This fact contributes substantially to the flexibility of the structure as a whole by allowing the local unbonded areas of the layers to shift with respect to each other. Furthermore, since at no place in the structure will more than two layers be bonded along a single line, the resin does not substantially increase the stiffness of the total structure, although as much as 20% of the total area of each side of each layer will be bonded to the adjacent layer. It is believed that the reason for the unusual flexibility of the structure is largely attributable to the fact that the open path between the resin lines permits the fabric layers to shift relative to each other. Where there are no open paths extending through the material, flexibility is substantially less.

It is a further advantage of my invention that the resin may be applied to the fabric by mass production coating or printing methods and large stacks of the fabric may be compiled and bonded without regard to registration of bonded areas longitudinally along the cloth.

Further objects and features of my invention will best be understood and appreciated from the following detailed description of a preferred embodiment thereof, selected for purposes of illustration and shown in the accompanying drawings, in which:

Fig. 1 is a view in front elevation of a representative garment employing the protective laminated structure of my invention;

Fig. 2 is a plan view of one of the protective panels employed in the garment shown in Fig. 1;

Fig. 3 is a fragmentary view illustrating in detail the spacing of the bonded portions of the structure; and Fig. 4 is a view in end elevation showing the staggered relationship between the bonded areas and the paths of unbonded area which pass entirely through the fabric.

The preferred embodiment of my invention comprises a laminated structure which may be employed for protecting many things. While it may be employed in sheet form as curtains, screens, blankets or the like, I have shown it herein, in Figs. 1 and 2 as employed in a protective garment 10. This garment may be a vest as is shown or may equally well comprise leggings, coats, and the like. Inasmuch as the precise form of the outer portion of the garment itself is not critical to this invention, it will not be further described in detail.

The protective portions of the garment comprise laminated panels which may be inserted in between the inner and outer layers of the garment, and one of these panels designated at 12 is shown in Fig. 2. The panel 12 covers one side of the breast portion of the garment 10, extends over the shoulder and covers the upper back portion of the garment 10. In the preferred embodiment of my invention, the panel 12 comprises thirteen layers designated by the reference numeral 14 of 2 x 2 basket weave high tenacity nylon fabric weighing 13 to 14 ounces per square yard. It will be understood, however, that other forms of weave may be suitable and also certain other strong and elastic fabrics having characteristics similar to those of nylon may be employed.

The layers 14 are bonded together by a bonding agent which may be a mixture of approximately equal parts of butadiene-acrylonitrile copolymer (such as sold by Angier Products Co. as resin SBP–1562 or SBP–1433) and phenolic resin (such as sold by Angier Products Co. as resin SBP–1513 or SBP–1434). Another highly suitable formulation is a mixture of approximately equal parts of a phenol formaldehyde resin and polyvinyl butyral resin (safety glass grade) in a solvent of alcohol and toluene; such an adhesive resin is sold by Bakelite Corporation as resin BJ–16320, and by Industrial Tape Corporation as Permacel 1500, the resin solids content of this adhesive is about 33–37%. With the line or bar lamination pattern arrangement, herein employed, the addition of about 2 parts or less by weight of resin to each 100 parts by weight of textile material is sufficient to produce good penetration-resisting or anti-ballistic results.

The layers 14 are bonded with the above said resin along lines or bars 16 which extend longitudinally the length of the fabric and which occupy approximately 20% of the surface area of one side of the layers 14. It will be understood that the outer layers 14 are only bonded on one surface thereof, while the intermediate layers 14 are bonded on each side thereof. However, regarding only one side of a layer 14 to which the resin is applied, it will be seen that approximately 80% of the surface area is free of resin. The areas of application of resin designated at 16 in the preferred embodiment of my invention are ½" wide which dimension is designated by the letter A in Fig. 3 and the space between the resin area 16 designated by the letter B in 2". It will also be seen in Figs. 3 and 4 that the resin is applied to succeeding layers in similar straight and parallel bars 16 but that the areas are applied in staggered relationship. Thus a given intermediate layer will have a pair of resin bars 16 spaced 2" apart on its upper surface and half-way between the two said bars on the upper surface, the said intermediate layer 14 will have a resin bar 16 on its under surface. With this structure it will now be seen that an absolutely resin-free path extends the full length of the fabric having a transverse dimension designated by the letter C in Fig. 3. In this preferred embodiment the dimension C is ¾".

The extreme flexibility of the laminated structure of my invention is due to the fact that the resin-free path extending through the fabric is sufficiently wide to permit the unbonded areas of the layers to shift substantially relative to one another without disturbing the arrangement of the layers as a whole. This has not been possible in previously employed structures and has accounted for their lack of flexibility. While it might be thought that binding two layers 14 together along a continuous line or bar 16 might tend to reduce the flexibility of the composite structure, I have found that it actually reduces the flexibility of the composite structure, I have found that it actually reduces the flexibility only to a very minor degree and that by staggering the bar laminations in the manner shown, an extremely flexible structure results without loss of anti-ballistic properties and without rendering the structure vulnerable to shifting or bunching in the garment. On the other hand the laminated structure has an unexpected capacity of conforming or draping itself in curved contours and may be conveniently rolled when used, for example, as a flap curtain.

It will be further noted that the laminating technique employed in fabricating protective panels herein described readily lends itself to mass production techniques because the resin may be applied by conventional coating or roll printing techniques at high speed and no longitudinal hand registration of succeeding layers is required.

Since numerous minor variations of the preferred embodiment of my invention herein shown will now be obvious to those skilled in the art, it is not my intention to confine this invention to the precise form or garment herein shown, but rather to limit it in terms of the appended claims.

Having thus described and disclosed a preferred embodiment of my invention, what I claim as new and desire to secure by Letters Patent is:

1. A flexible protective structure comprising a multiplicity of layers of 2 x 2 basket weave nylon fabric; a synthetic resin bonding said layers together to improve the anti-ballistic properties of the said structure and to prevent said layers as a whole from shifting and bunching; said layers being bonded along lines in staggered relation, said lines being approximately one-half inch in width and spaced approximately two inches apart on the upper surface of an intermediate layer and the lines on the under surface of said intermediate layer being similarly dimensioned and spaced but being located approximately mid-way between the said lines on the said upper surface thus providing unbonded paths in each said layer at least three-quarters of an inch in width extending lengthwise and providing a flexible structure capable of being rolled on itself.

2. The flexible protective structure defined in claim 1 in which the bonded lines, while staggered between adjacent layers, are substantially superposed between alternate layers of fabric.

References Cited in the file of this patent
UNITED STATES PATENTS

| | | |
|---|---|---|
| 1,924,472 | Thomson | Aug. 29, 1933 |
| 2,640,987 | Ehlers | June 9, 1953 |